US010632580B2

(12) United States Patent
Arai

(10) Patent No.: US 10,632,580 B2
(45) Date of Patent: Apr. 28, 2020

(54) HEAVY OBJECT SUPPORTING DEVICE

(71) Applicant: Yugen Kaisha Newly Laboratory, Kyoto (JP)

(72) Inventor: Takao Arai, Kyoto (JP)

(73) Assignee: Yugen Kaisha Newly Laboratory, Kyoto (JP)

( * ) Notice: Subject to any disclaimer, the term of this patent is extended or adjusted under 35 U.S.C. 154(b) by 95 days.

(21) Appl. No.: 15/341,266

(22) Filed: Nov. 2, 2016

(65) Prior Publication Data
US 2017/0304970 A1   Oct. 26, 2017

(30) Foreign Application Priority Data

Apr. 26, 2016   (JP) .................................. 2016-088122

(51) Int. Cl.
*B23Q 1/38* (2006.01)
*B23Q 1/25* (2006.01)
*F16M 11/04* (2006.01)
*F16M 11/18* (2006.01)

(52) U.S. Cl.
CPC .............. *B23Q 1/385* (2013.01); *B23Q 1/25* (2013.01); *F16M 11/046* (2013.01); *F16M 11/18* (2013.01)

(58) Field of Classification Search
CPC .. B23Q 1/383; B23Q 1/38; B23Q 3/18; F16C 29/025; F16C 29/02; F16C 32/06; F16C 32/0666; F16M 11/18; F16M 11/046; B60S 11/00; B25B 1/00; B25B 1/2463; B25B 1/2484; B25B 11/00
See application file for complete search history.

(56) References Cited

U.S. PATENT DOCUMENTS

| 2,877,538 | A | * | 3/1959 | Coulon | ............... F16C 32/0651 |
| | | | | | 29/898.02 |
| 3,253,665 | A | * | 5/1966 | Schienle | .................. B23Q 1/38 |
| | | | | | 180/125 |
| 3,277,696 | A | * | 10/1966 | Maurice | ............... F16C 29/025 |
| | | | | | 248/631 |

(Continued)

FOREIGN PATENT DOCUMENTS

| CN | 1318136 A | 10/2001 |
| FR | 2606473 A1 | 5/1988 |

(Continued)

*Primary Examiner* — Orlando E Aviles
*Assistant Examiner* — Seahee Yoon
(74) *Attorney, Agent, or Firm* — The Webb Law Firm

(57) ABSTRACT

A heavy object supporting device includes: a mounting table which is arranged to face a base, and on which a supported object is mounted; an annular sealing member which is arranged between the mounting table and the base and can be elastically compressed in the direction in which the mounting table and the base face each other; and a separation preventing structure which prevents separation between the mounting table and the base. A space, which is defined by the mounting table, the base, and the sealing member, is formed as a fluid-filled space that is sealed in a state filled with fluid. The separation preventing structure is configured to allow the mounting table to be moved relative to the base in the facing direction and the direction orthogonal to the facing direction while maintaining the sealed state of the fluid-filled space.

2 Claims, 12 Drawing Sheets

(56) References Cited

U.S. PATENT DOCUMENTS

| | | | | |
|---|---|---|---|---|
| 3,465,481 A * | 9/1969 | Szwarcman | B23C 1/00 | 451/55 |
| 3,578,281 A * | 5/1971 | Nielsen | F16C 29/025 | 248/346.03 |
| 3,595,555 A * | 7/1971 | Cameron | B25B 5/065 | 269/20 |
| 3,711,167 A * | 1/1973 | Ennis | B23Q 1/38 | 384/12 |
| 3,791,086 A * | 2/1974 | Pinn | B24B 37/00 | 451/505 |
| 4,073,549 A * | 2/1978 | Christ | F16C 32/0666 | 384/122 |
| 4,234,175 A * | 11/1980 | Sato | F16C 29/025 | 269/73 |
| 4,239,300 A * | 12/1980 | Adler | F16C 32/0666 | 384/120 |
| 6,644,856 B2 | 11/2003 | Lasch | | |
| 7,093,979 B2 * | 8/2006 | Sawada | F16C 29/025 | 384/12 |
| 7,549,801 B2 * | 6/2009 | Arai | F16J 15/166 | 384/13 |
| 8,944,157 B2 * | 2/2015 | Mail | B66F 3/26 | 166/383 |
| 9,046,131 B2 * | 6/2015 | Sato | F16C 43/02 | |
| 2001/0021284 A1 | 9/2001 | Lasch | | |
| 2002/0054717 A1* | 5/2002 | Zywno | B25B 11/005 | 384/12 |
| 2003/0006756 A1 | 1/2003 | Tsuruta | | |
| 2007/0170344 A1 * | 7/2007 | Arai | F16J 15/166 | 248/694 |
| 2008/0122151 A1* | 5/2008 | Ito | F16C 32/06 | 269/20 |
| 2013/0209007 A1* | 8/2013 | Corts | B21B 31/02 | 384/8 |
| 2016/0115994 A1* | 4/2016 | Tada | F16C 29/025 | 384/12 |

FOREIGN PATENT DOCUMENTS

| | | |
|---|---|---|
| JP | 56156546 U1 | 11/1981 |
| JP | 2001150271 A | 6/2001 |
| JP | 2002542437 A | 12/2002 |
| JP | 200321142 A | 1/2003 |
| WO | 2005075859 A1 | 8/2005 |

* cited by examiner

F I G . 6B
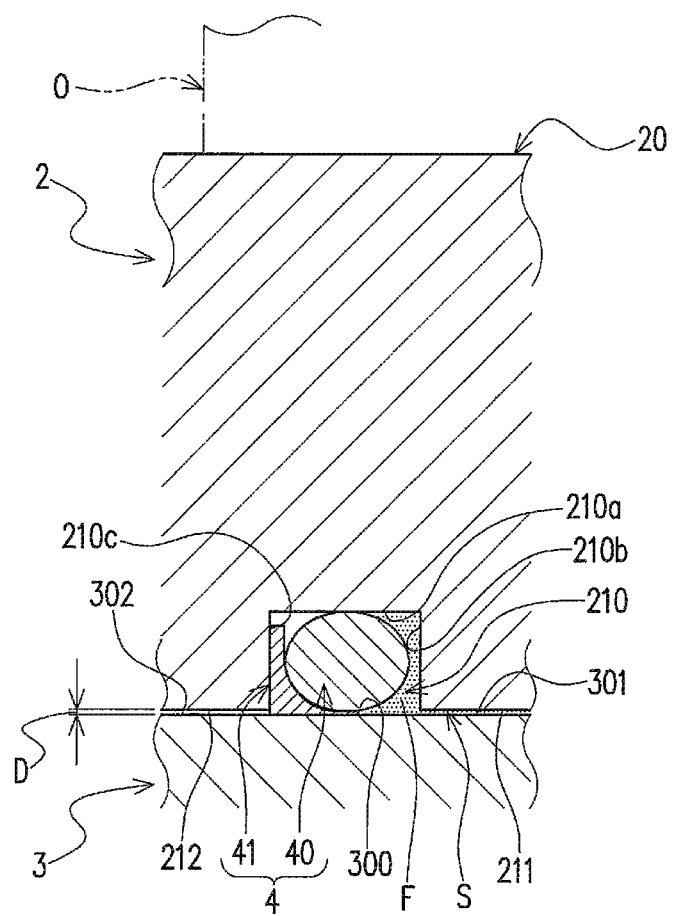

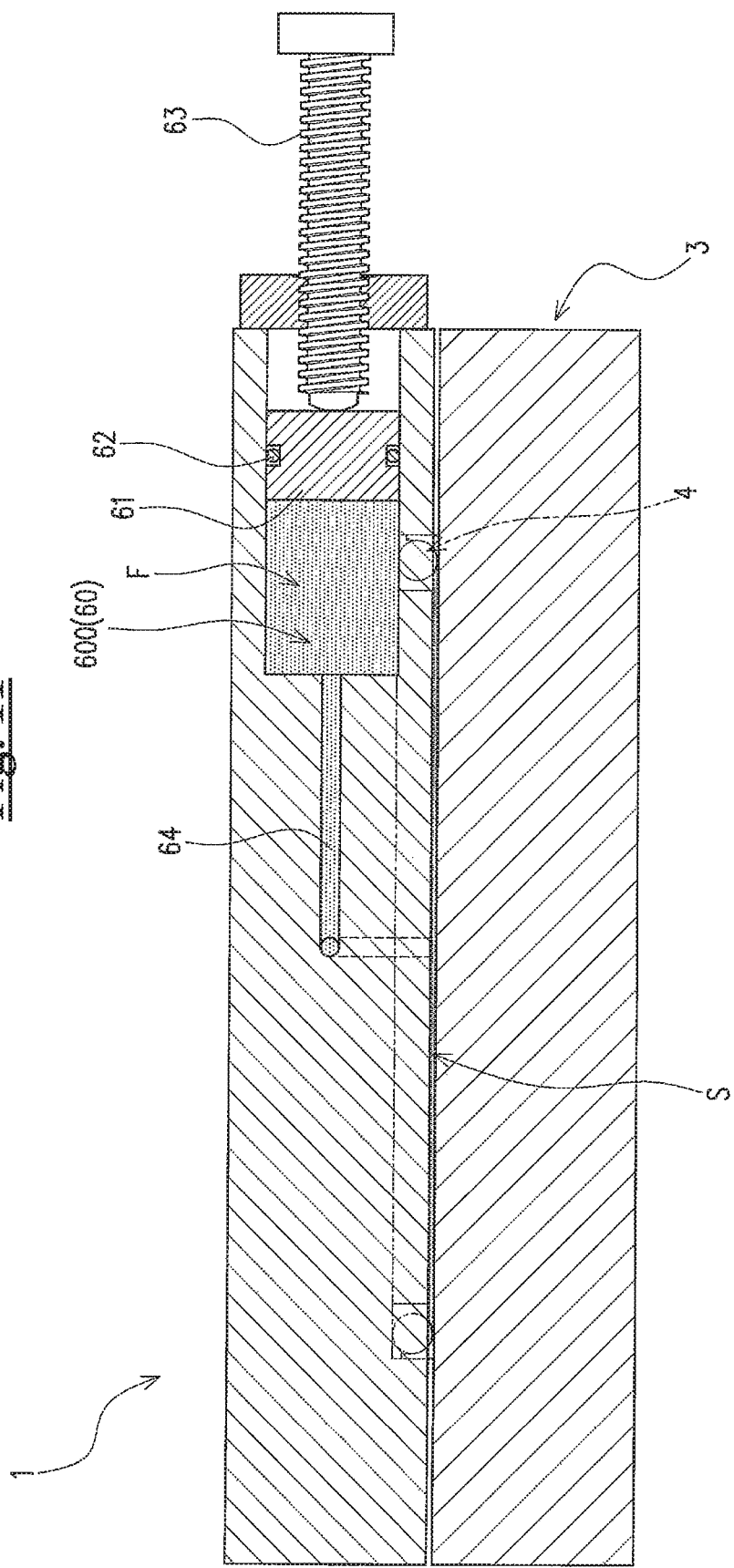

HEAVY OBJECT SUPPORTING DEVICE

CROSS-REFERENCE TO RELATED APPLICATION

This application claims priority to Japanese Patent Application No. 2016-088122, filed Apr. 26, 2016, the disclosure of which is hereby incorporated in its entirety by reference.

BACKGROUND OF THE INVENTION

Field of the Invention

The present invention relates to a heavy object supporting device which movably supports a heavy object.

Background Art

Conventionally, when a work (workpiece) is machined by a machine tool, working (so-called, centering working) is performed to adjust the position of the work so that the work is disposed at a position suitable for machining the work. Further, when the work to be machined is a heavy object, a heavy object supporting device for movably supporting the work is used.

The heavy object supporting device includes: a support body having a slip surface on which a heavy object is mounted; a fluid sealing mechanism having an elastic ring which is arranged in an annular ring groove formed in the slip surface; and fluid supply means which supplies pressurized fluid in a hydraulic pocket that is a space surrounding the elastic ring provided between the slip surface and the heavy object mounted on the slip surface. Further, a fluid supply passage for guiding the oil supplied from the fluid supply means into the hydraulic pocket is formed in the support body (see, for example, Patent Literature 1).

In the above-described heavy object supporting device, when the heavy object is mounted on the slip surface of the support body, the heavy object is brought into close contact with the entire circumference of the elastic ring, so that the hydraulic pocket is formed.

Then, as the oil fed from the fluid supply means passes through the fluid supply passage to flow into the hydraulic pocket, the hydraulic pressure in the hydraulic pocket is increased. Further, when the hydraulic pressure in the hydraulic pocket is sufficiently increased, the heavy object on the support body is lifted to be separated from the slip surface. Thereby, the heavy object is movably supported on the support body.

CITATION LIST

Patent Literature

Patent Literature 1: International Publication No. WO 2005/075859

SUMMARY OF THE INVENTION

Technical Problem

Meanwhile, in the above-described heavy object supporting device, the space opened on the slip surface (space surrounded by the elastic ring on the slip surface) is closed by the heavy object, and thereby, the hydraulic pocket is formed. For this reason, in order to support the heavy object by increasing the hydraulic pressure in the hydraulic pocket, it is necessary that the hydraulic pressure enough to be able to support the heavy object is generated by supplying the oil into the hydraulic pocket from the outside, and thereby, the hydraulic pressure is maintained.

Under such circumstance, it is necessary that the above-described heavy object supporting device is provided with a device or controlling for such a device, for supplying the oil into the hydraulic pocket from the outside, and for maintaining the hydraulic pressure in the hydraulic pocket. However, in some use environments, a simple and easy-to-use structure for it may be desired.

Therefore, the present invention has been made in view of such circumstances as described above, and an object of the invention is to provide a heavy object supporting device which can generate pressure for supporting a heavy object and maintain the pressure without supplying fluid from the outside.

Solution to Problem

A heavy object supporting device according to the present invention is configured by including:

a mounting table on which a supported object is mounted;

a base which is arranged to face the mounting table to form a gap between the mounting table and the base;

at least one elastic annular sealing member which is arranged between the mounting table and the base; and a separation preventing structure which prevents separation between the mounting table and the base, the base and the mounting table respectively having facing surfaces facing each other, the at least one sealing member being held in close contact with the base and the mounting table with each of the at least one sealing member being arranged in an annular arrangement groove which is formed in one of the mounting table and the base and which is opened toward the other of the mounting table and the base, a space, which is formed between the mounting table and the base and surrounded by the at least one sealing member, being formed as a fluid-filled space that is sealed in a state filled with fluid, the at least one sealing member being formed to support the mounting table to form a gap between the mounting table and the base, and is formed to be able to be compressed to reduce the gap between the mounting table and the base, and the separation preventing structure being configured to regulate relative movement between the base and the mounting table in a direction such that the mutually facing surfaces of the base and the mounting table come close to each other and away from each other, and relative movement between the base and the mounting table in the direction orthogonal to the direction in which the mutually facing surfaces of the base and the mounting table come close to each other and away from each other, within a range to keep the close contact between the at least one sealing member and the mounting table.

Further, the heavy object supporting device of the present invention may be configured such that the at least one sealing member is configured by a plurality of the sealing members, each of the plurality of sealing members is arranged between the single mounting table and the single base, and the space surrounded by each of the plurality of sealing members is configured as the fluid-filled space.

Further, the heavy object supporting device of the present invention may be configured by including a pressure control structure which controls the pressure of the fluid in the fluid-filled space, and includes an adjustment chamber in which a storage space, communicating with the fluid-filled space and sealed in the state filled with the fluid, is formed, the adjustment chamber being configured to be able to change the pressure in the storage space.

BRIEF DESCRIPTION OF THE DRAWINGS

FIG. 6B is an explanatory view of the basic configuration of the heavy object supporting device according to the first embodiment and is an illustration in the state where the heavy object mounted on the mounting table is supported;

FIG. 11 is a sectional view of the heavy object supporting device according to the still another embodiment of the present invention and is a sectional view along the line XI-XI in FIG. 10.

DETAILED DESCRIPTION OF THE PREFERRED EMBODIMENT

In the following, a heavy object supporting device according to a first embodiment of the present invention will be described with reference to the accompanying drawings. The heavy object supporting device according to the present embodiment is configured to movably support a heavy object. It should be noted that, in the present embodiment, the heavy object means, for example, a work (workpiece) to be subjected to machining by a machine tool, a mount frame for mounting the work thereon, or the like.

Figure 1:
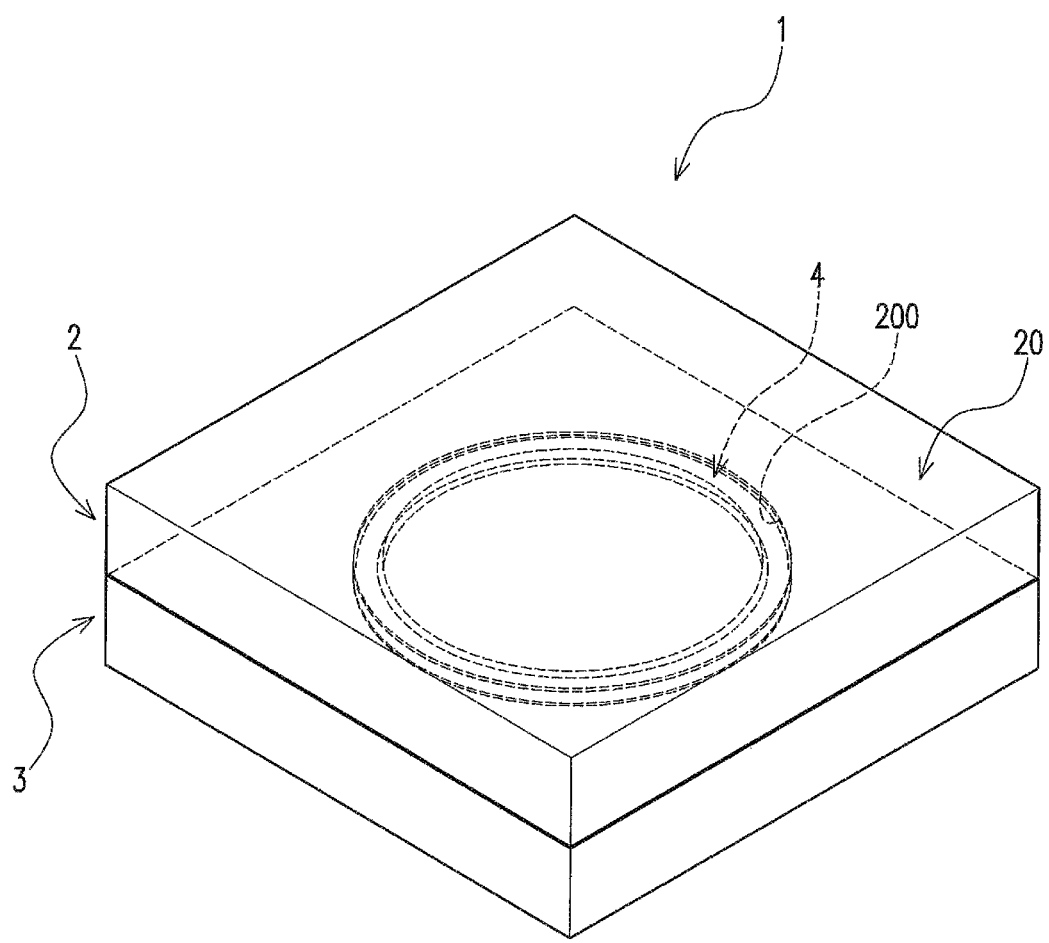
FIG. 1 is a perspective view of a basic configuration of a heavy object supporting device according to a first embodiment of the present invention.
Figure 2:
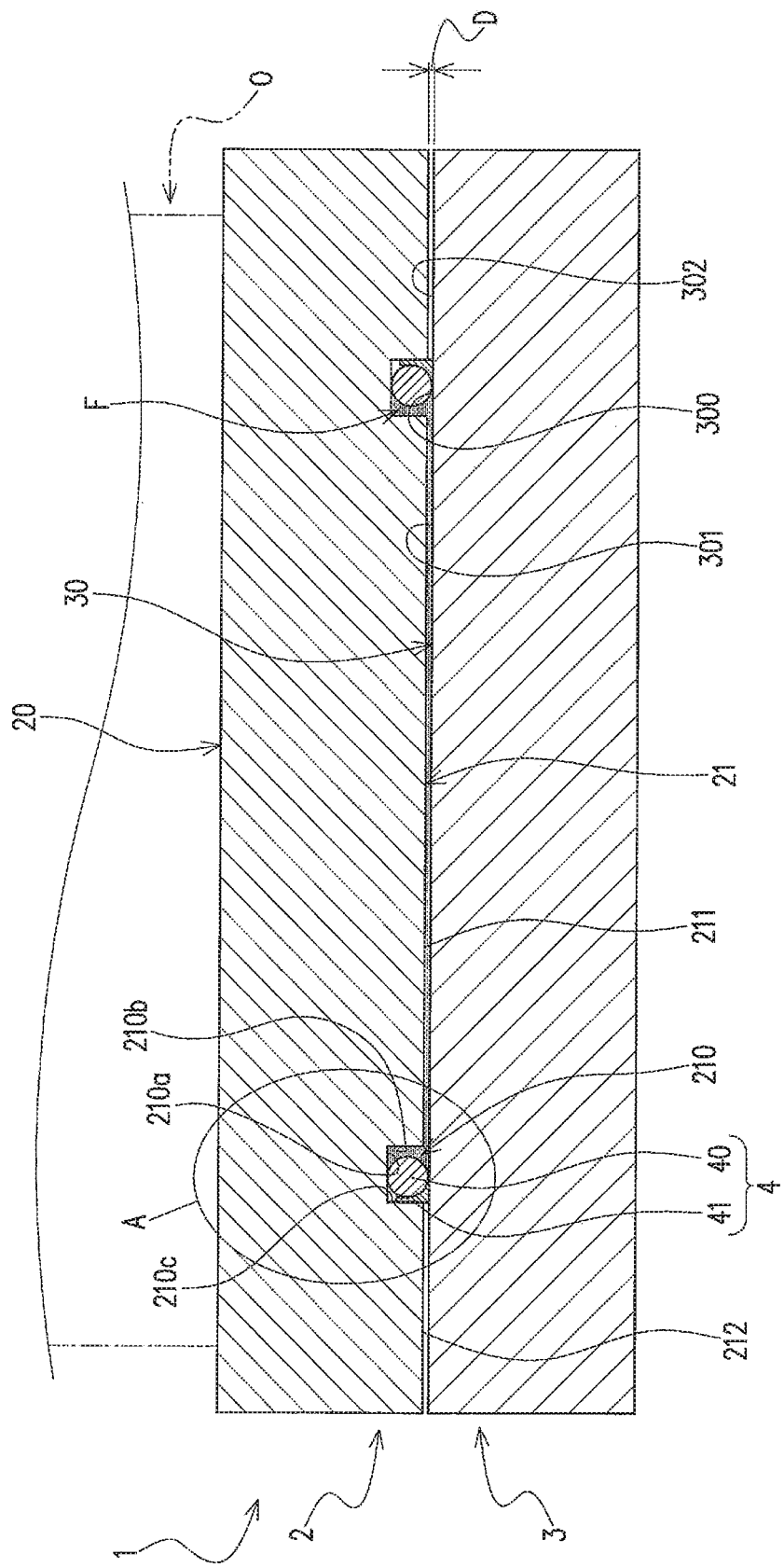
FIG. 2 is a longitudinal sectional view of the basic configuration of the heavy object supporting device according to the first embodiment.

First, the basic configuration of a heavy object supporting device 1 according to the present embodiment will be described. As shown in FIG. 1 and FIG. 2, the heavy object supporting device 1 includes: a mounting table 2 on which a heavy object O is mounted; a base 3 which is arranged to face the mounting table 2 to form a gap D between the mounting table 2 and the base 3; and an elastic annular sealing member 4 which is arranged in an annular groove (arrangement groove 210 described below) that is formed in the mounting table 2 to open toward the base 3.

Figure 3:
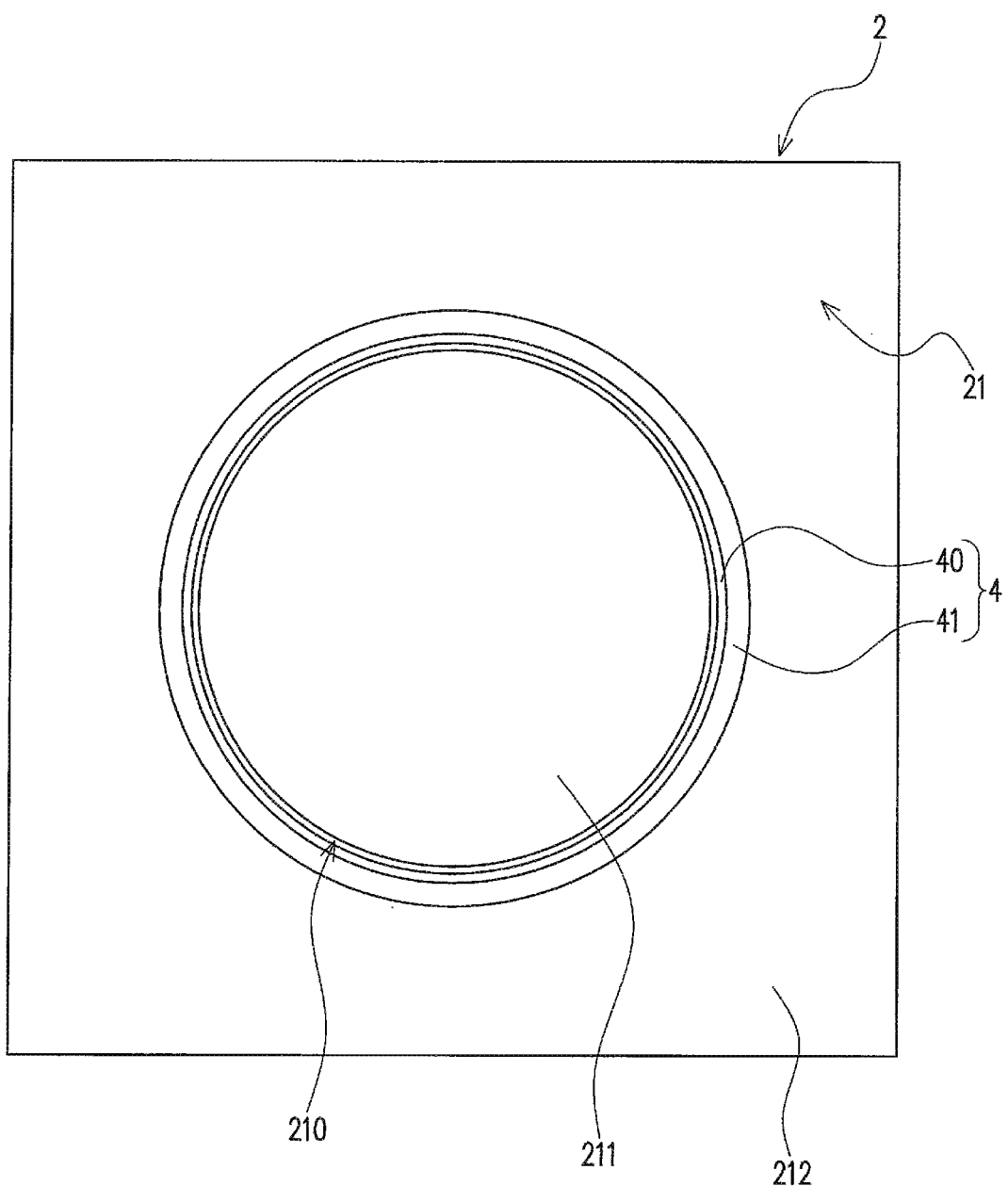
FIG. 3 is a bottom view of the basic configuration of the heavy object supporting device according to the first embodiment and is a bottom view of a mounting table.

As shown in FIG. 2 and FIG. 3, the mounting table 2 includes a mounting surface 20 which receives the heavy object O mounted thereon (see FIG. 2), and a facing surface 21 which is located opposite to the mounting surface 20 and faces the base 3.

The arrangement groove 210, which is an endless annular groove and in which the sealing member 4 is arranged, is formed in the facing surface 21. Further, the facing surface 21 includes a pressure receiving surface 211 which is located in a region surrounded by the arrangement groove 210, and a slip surface 212 which is located in a region outside the arrangement groove 210.

As shown in FIG. 2, the arrangement groove 210 is defined by a bottom surface 210a formed as an annular plane, an inner wall surface 210b extending vertically (orthogonally) to the bottom surface 210a, and an outer wall surface 210c extending vertically (orthogonally) to the bottom surface 210a.

The arrangement groove 210 is formed deep so that the sealing member 4, which is arranged in the arrangement groove 210, partially protrudes from the facing surface 21 to the side of the base 3. Therefore, the sealing member 4, which is arranged in the arrangement groove 210, partially protrudes from the arrangement groove 210 to the side of the base 3 in each of the non-supporting state in which the heavy object O is not mounted on the mounting table 2 (see FIG. 6A), and of the supporting state in which the heavy object O mounted on the mounting table 2 is supported (see FIG. 6B).

In this way, in the heavy object supporting device 1 according to the present embodiment, the sealing member 4 partially protrudes from the arrangement groove 210 to the side of the base 3 in each of the supporting state and the non-supporting state. Therefore, while the state, in which the sealing member 4 is in close contact with the mounting table 2 and the base 3, is maintained, the mounting table 2 can be brought into contact with or separated from the base 3 so that the distance between the slip surface 212 of the mounting table 2 and a below-described sealing surface 30 of the base 3 is increased or reduced.

The width of the arrangement groove 210 (the gap between the inner wall surface 210b and the outer wall surface 210c) is set to be larger than the width of the sealing member 4. For this reason, in the present embodiment, the sealing member 4 arranged in the arrangement groove 210 is arranged to be in contact with the entire circumference of the outer wall surface 210c, and is arranged to face the inner wall surface 210b and to be separated from the inner wall surface 210b.

The pressure receiving surface 211 is formed to be located on the side closer to the mounting surface 20 than an outer end of a portion of the sealing member 4, which portion protrudes from the arrangement groove 210. It should be noted that the pressure receiving surface 211 can ensure the gap D with respect to the base 3 (to a below-described sealing surface 30 of the base 3) in each of the state of supporting the heavy object O and the state of not supporting the heavy object O. Therefore, the pressure receiving surface 211 and the slip surface 212 may be formed to expand on the same plane. The pressure receiving surface 211 is formed at the same height level as the slip surface 212 in the direction (hereinafter referred to as orthogonal direction) of the plane orthogonal to the pressure receiving surface 211, and is parallel to the slip surface 212. It should be noted that the pressure receiving surface 211 may be formed to be located closer to the side of the base 3 than the slip surface 212 is, or may be formed to be located closer to the side of the mounting surface 20 than the slip surface 212 is.

Figure 4:
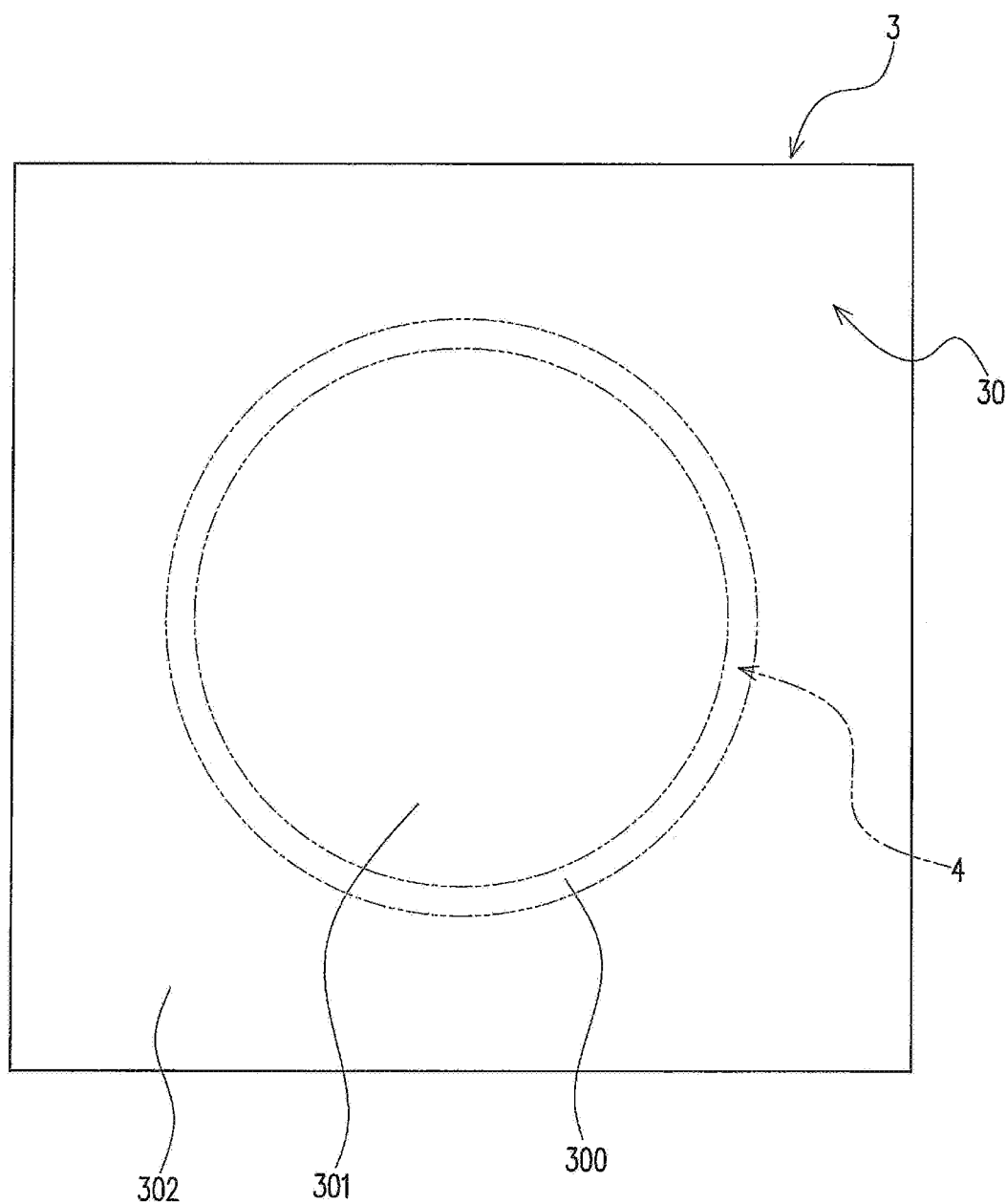
FIG. 4 is a plan view of the basic configuration of the heavy object supporting device according to the first embodiment and is a plan view of a base.

As shown in FIG. 2 and FIG. 4, the base 3 has the facing surface (referred to as sealing surface in the present embodiment) 30 arranged to face the mounting table 2. The sealing surface 30 is a plane parallel to the slip surface 212.

The sealing surface 30 of the base 3 according to the present embodiment is formed to face the slip surface 212 of the mounting table 2 and to be separated from the slip surface 212 by the gap D in the above-described orthogonal direction in each of the supporting state and the non-supporting state.

It is configured such that the gap D between the sealing surface 30 of the base 3 and the slip surface 212 of the mounting table 2 is maximum in the non-supporting state and is reduced at the time when the operation is shifted from the non-supporting state to the supporting state. It should be noted that the base 3 and the mounting table 2 are configured so that the state where the gap D between the base 3 and the mounting table 2 is left in the supporting state.

The sealing surface 30 is a flat surface formed over the entire region of the base 3 and is arranged to face the facing surface 21 of the mounting table 2. Further, the sealing member 4 arranged in the arrangement groove 210 is brought into pressure contact with the sealing surface 30. Thereby, the sealing surface 30 and the bottom surface 210a of the arrangement groove 210 cooperate with each other to compress the sealing member 4.

In the following description of the present embodiment, there is a case where the region, in which the sealing member 4 is in contact with the sealing surface 30, is referred to as a seal region 300, where the region inside the seal region 300 is referred to as an inner pressure-receiving region 301, and where the region outside the seal region 300 is referred to as an outer slide region 302.

The entire circumference of the sealing member 4 is held in close contact with the mounting table 2 and the base 3. Further, the space between the mounting table 2 and the base 3, which space is surrounded by the sealing member 4, is filled with fluid (oil in the present embodiment) F. For this reason, the space between the mounting table 2 and the base 3, which space is surrounded by the sealing member 4, is configured as a fluid-filled space which is sealed in the state filled with the fluid F. As a result, the space between the mounting table 2 and the base 3 is formed as a sealed fluid-filled space filled with a fixed amount of fluid F such that operation of the device occurs using only the fluid amount of fluid F in the space.

Figure 5:
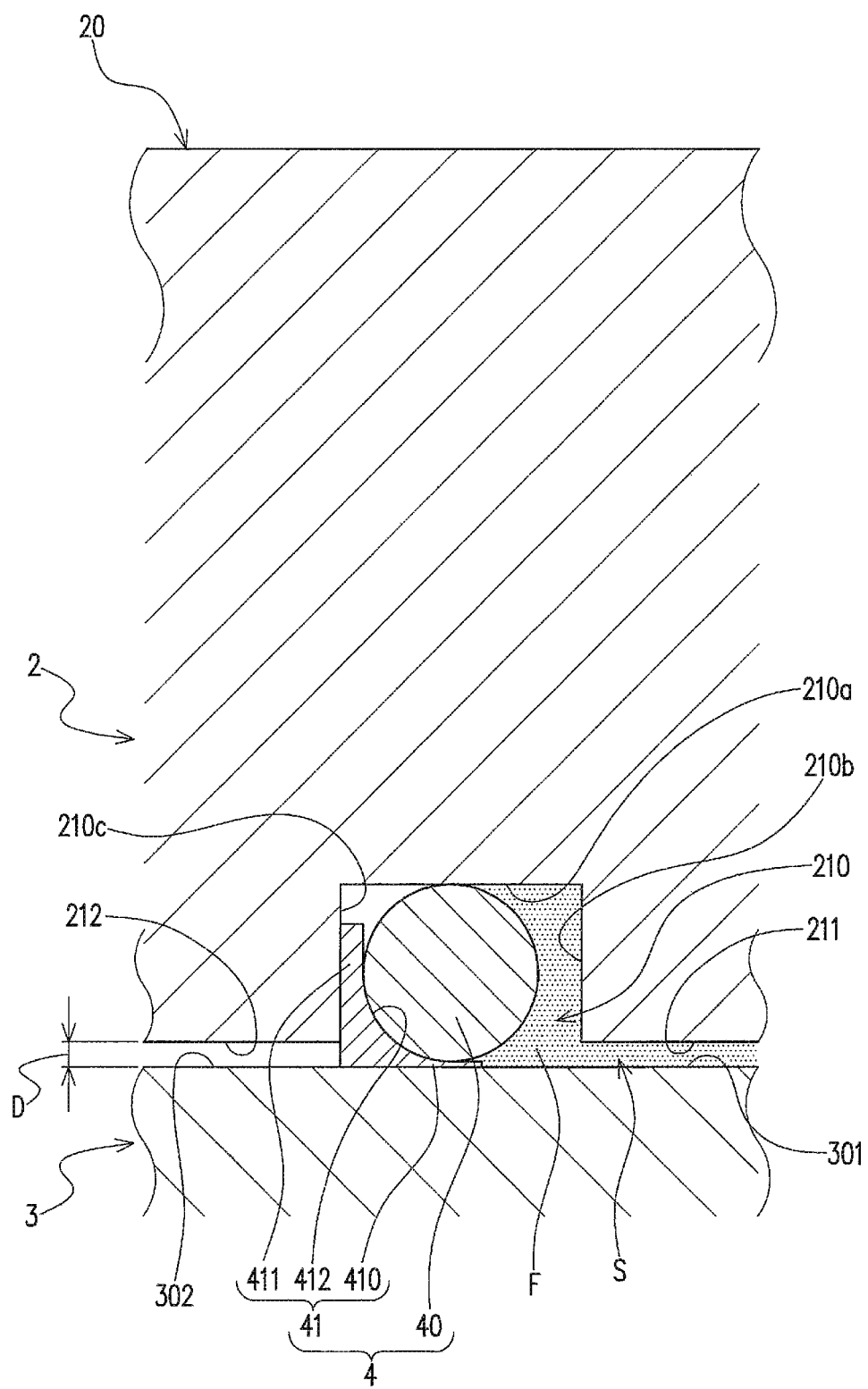
FIG. 5 is an enlarged view of the basic configuration of the heavy object supporting device according to the first embodiment and is an enlarged view of the region A of FIG. 2.

As shown in FIG. 5, the sealing member 4 includes an elastic annular sealing ring 40, and an annular protection ring 41 externally fitted to the sealing ring 40.

The sealing ring 40 has a circular cross section. Further, the sealing ring 40 is formed and sized so that the sealing ring 40 partially protrudes from the arrangement groove 210 when the sealing ring 40 is arranged in the arrangement groove 210. That is, the size (cross-sectional diameter) of the sealing ring 40 is larger than the depth of the arrangement groove 210.

The protection ring 41 includes a regulating section 410 sandwiched between the sealing ring 40 and the base 3, and a peripheral wall section 411 continuously extending to the regulating section 410 and arranged in the arrangement groove 210. Further, a receiving concave section 412 having a shape conforming to the outer shape of the sealing ring 40 is formed on the inner periphery side of the protection ring 41.

As described above, the sealing ring 40 partially protrudes from the arrangement groove 210, and hence, the regulating section 410 externally fitted to the sealing ring 40 also partially protrudes from the arrangement groove 210.

The entire periphery of the peripheral wall section 411 is sandwiched between the outer wall surface 210c of the arrangement groove 210 and the sealing ring 40, and is in contact with the sealing surface 30 of the base 3.

Figure 7:
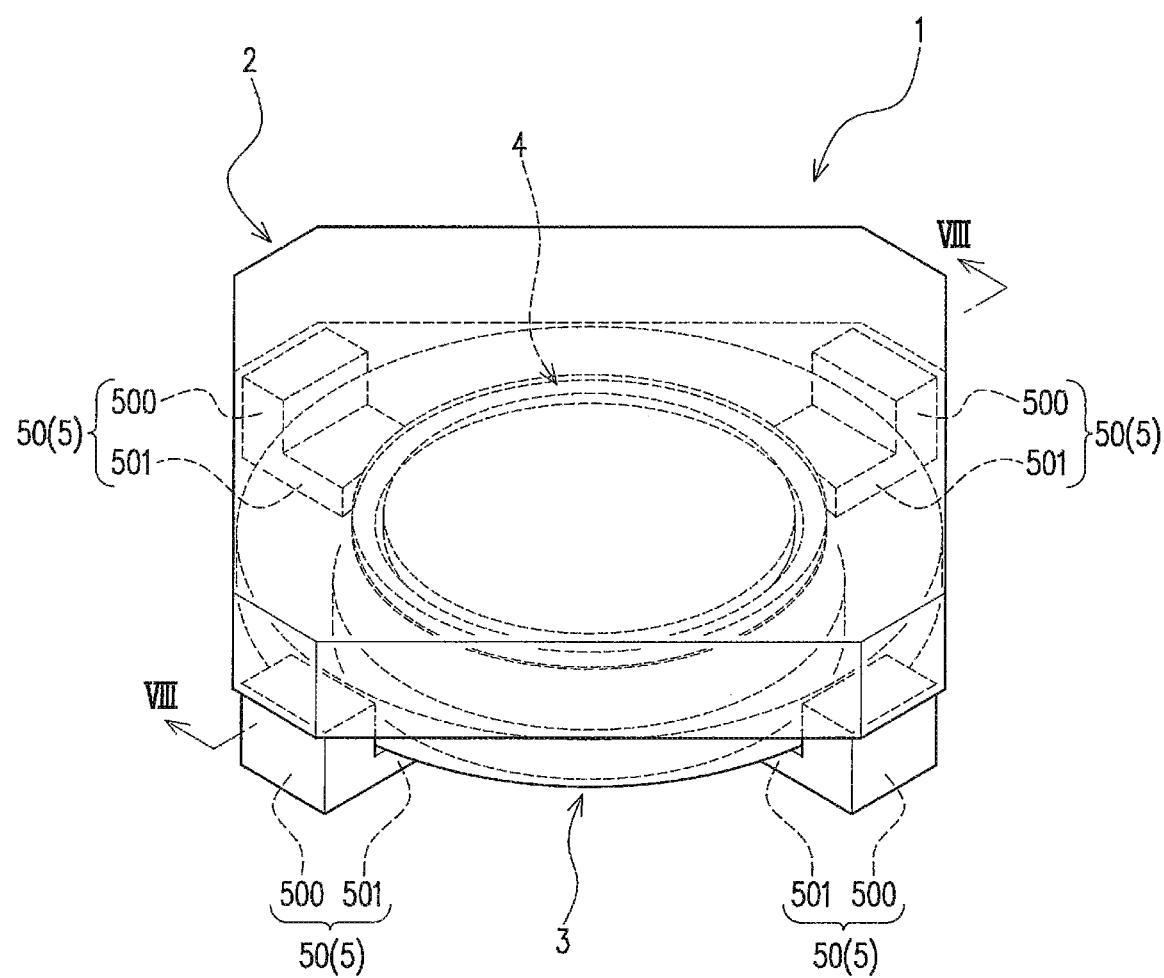
FIG. 7 is a perspective view of the heavy object supporting device according to the first embodiment.
Figure 8:
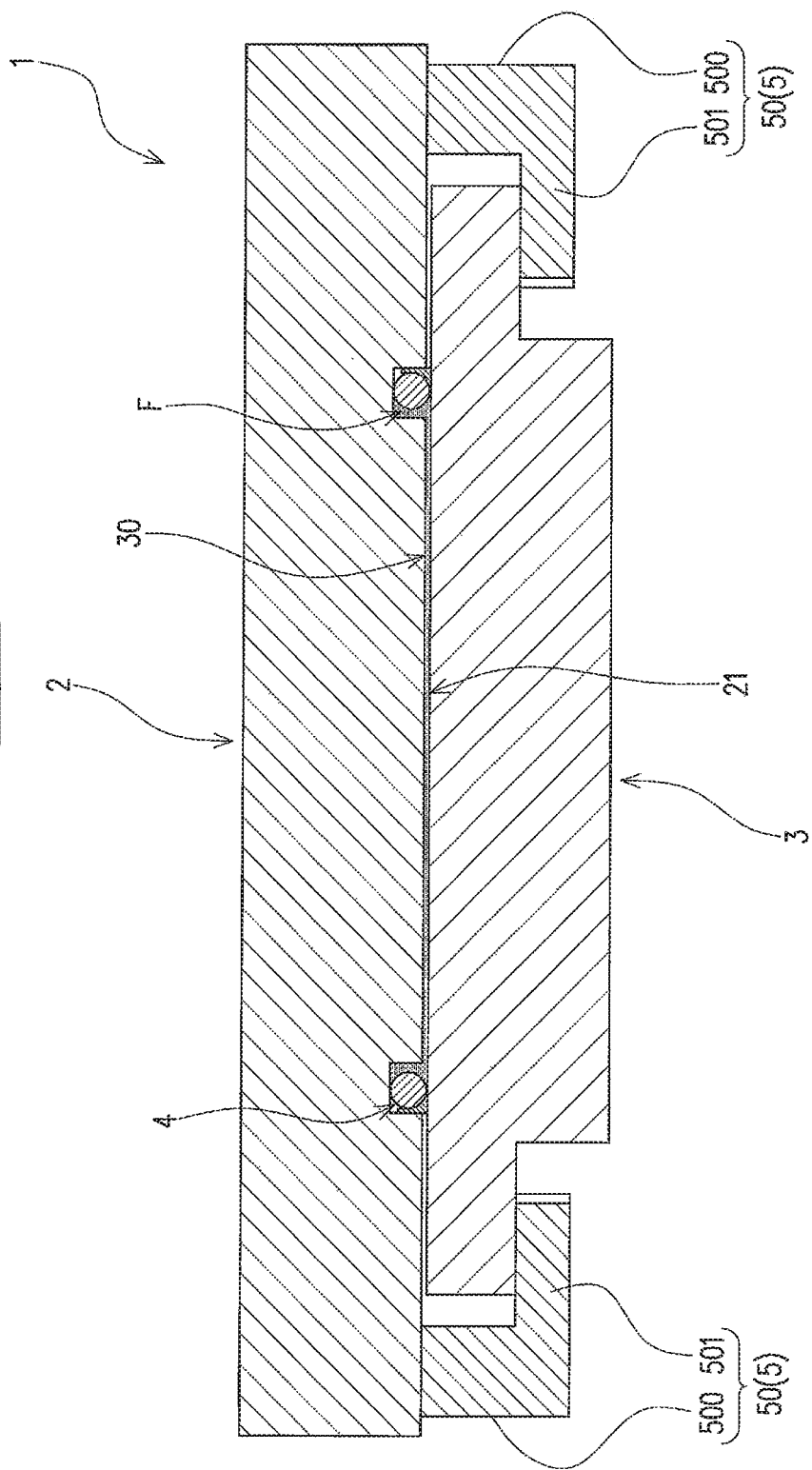
FIG. 8 is a sectional view of the heavy object supporting device according to the first embodiment and is a sectional view along the line VIII-VIII in FIG. 7.

Further, as shown in FIG. 7 and FIG. 8, the heavy object supporting device 1 according to the present embodiment includes a separation preventing structure 5 for preventing the separation of the mounting table 2 and the base 3, in addition to the mounting table 2, the base 3, and the sealing member 4 which are basic configuration as described above.

The separation preventing structure 5 may be configured by including at least one regulating section 50 having an abutment stop section 500 fixed to the mounting table 2 and facing the side surface of the base 3, and a holding section 501 continuously extending to the abutment stop section 500 and facing the surface of the base 3 on the side opposite to the sealing surface 30. It should be noted that the heavy object supporting device 1 shown in FIG. 7 and FIG. 8 includes four regulating sections 50.

The regulating sections 50 are arranged around the base 3 to be equally spaced from each other or to be substantially equally spaced from each other.

The abutment stop section 500 is configured to allow the mounting table 2 to be slid and rotated on the base 3 in a range in which the fluid-filled space S configured by the sealing member 4, the mounting table 2, and the base 3 is not destroyed (opened), and thereby, the close contact state in the fluid-filled space S is maintained.

The holding section 501 is configured to allow the mounting table 2 to be brought into contact with and separated from the base 3 in the above-described orthogonal direction in the range in which the close contact state between the sealing member 4 and the mounting table 2 and between the sealing member 4 and the base 3 is maintained.

In this way, the separation preventing structure 5 is configured to allow the mounting table 2 to be brought into contact with and separated from the base 3 in the orthogonal direction, and to allow the mounting table 2 to be movable relative to the base 3 in the direction (slide direction) perpendicular to the orthogonal direction, in the range in which the close contact state between the sealing member 4 and the mounting table 2 and between the sealing member 4 and the base 3 is maintained.

The heavy object supporting device 1 according to the present embodiment is configured as described above. Next, the method of use of the heavy object supporting device 1 according to the present embodiment will be described with reference to the accompanying drawings.

Figure 6A:
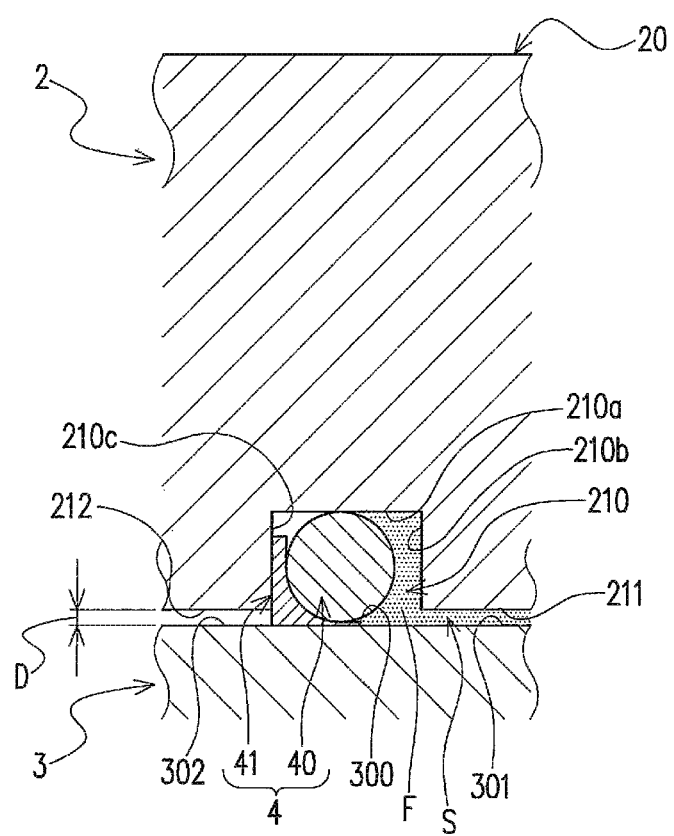
FIG. 6A is an explanatory view of the basic configuration of the heavy object supporting device according to the first embodiment and is an explanatory view in the state where the heavy object is not mounted on the mounting table.

As shown in FIG. 6A, in the heavy object supporting device 1, the gap between the mounting table 2 and the base 3 is maximum in the non-supporting state. Then, when the heavy object O is mounted on the mounting surface 20 as shown in FIG. 6B, the sealing ring 40 of the sealing member 4 is pressed by the mounting table 2 under the load of the heavy object O, and thereby, the mounting table 2 is made close to the base 3. In this case, as the gap between the mounting table 2 and the base 3 is made smaller, the pressure of the fluid F in the fluid-filled space S is increased.

Thereby, the generated pressure of the fluid F is applied to the mounting table 2 (a part of the load of the heavy object O is received by the generated pressure of the fluid F), and thereby, the mounting table 2 and the heavy object O can be moved linearly or rotated with a very small force in the plane parallel to the slip surface 212.

It should be noted that, when the mounting table 2 is made close to the base 3, and thereby when the facing surface 21 of the mounting table 2 is inclined with respect to the sealing surface 30 of the base 3 so that a part of the facing surface 21 is brought into contact with the sealing surface 30, the heavy object O is brought into a state of being supported by the generated pressure of the fluid F, and the reaction force generated at the contact portion between the facing surface 21 and the sealing surface 30. Also in this case, a part of the load of the heavy object O is supported by the generated pressure of the fluid F, and hence, the heavy object O can be moved linearly or rotated with a very small force.

Then, when the heavy object O is removed from the mounting table 2, the mounting table 2 is moved in the direction away from the base 3, and thereby, the gap D between the mounting table 2 and the base 3 is increased, so that the pressure of the fluid F in the fluid-filled space S is reduced (to return to the original pressure). According to this, the sealing member 4 is restored to its original shape by the elastic force, and thereby, again, the heavy object supporting device 1 is held in the state (standby state) of capable of supporting the heavy object O.

As described above, in the heavy object supporting device 1, before and after the heavy object O is supported, the fluid-filled space S filled with the fluid F sealed beforehand is maintained in the sealed state, that is, in the state where the outflow of the fluid F in the fluid-filled space S is prevented, and where the entry of air into the fluid-filled space S is prevented.

Therefore, in the heavy object supporting device 1, when the heavy object O is mounted on the mounting surface 20, the pressure of the fluid F naturally increases, and hence, the pressure for supporting the heavy object O can be generated and maintained without the liquid F being supplied from the outside into the fluid-filled space S. Thereby, the heavy object supporting device 1 has an excellent effect of being able to be simply and easily used.

Further, in the heavy object supporting device 1, the entire circumference of the sealing member 4 is brought into close contact with the outer wall surface 210c of the arrangement groove 210. Thereby, even when the pressure of the fluid F in the fluid-filled space S is increased so that the outward pressure of the fluid F is applied to the sealing member 4, outward movement and elongation of the sealing member 4 are regulated by the outer wall surface 210c. Therefore, in the heavy object supporting device 1, the volume change of the fluid-filled space S in the radial direction of the arrangement groove 210 is suppressed, and thereby, the pressure of the fluid F is efficiently increased.

Further, the heavy object supporting device 1 is configured such that the mounting table 2 is brought into contact with and separated from the base 3 in the orthogonal direction, and thereby, the pressure of the fluid F in the fluid-filled space S is changed. Thereby, at the same time when the heavy object O is mounted on the mounting table 2, the pressure of the fluid F in the fluid-filled space S begins to increase. At the same time when the heavy object O is removed from the mounting table 2, the pressure of the fluid F in the fluid-filled space S begins to fall (returns to the original pressure).

Therefore, without the need for an operation from the outside (such as supply and recovery of the fluid F), the heavy object supporting device 1 can automatically shift between the state where the pressure of the fluid F filled in the fluid-filled space S, which pressure is required to support the heavy object O, is generated, and the state where the heavy object O is not mounted on the mounting table 2 and therefore pressure of the fluid F filled in the fluid-filled space S is not required to be generated.

Further, the heavy object supporting device 1 is formed in the state where the fluid F, which generates the pressure required to support the heavy object O, is sealed beforehand in the space surrounded by the sealing member 4 (space defined by the mounting table 2, the base 3, and the sealing member 4). Thereby, the heavy object supporting device 1 does not require a device for supplying the fluid F into the fluid-filled space S from the outside, a device for controlling the flow of the fluid F supplied into the fluid-filled space S from the outside, and the like, and hence, the heavy object supporting device 1 can be downsized and simplified.

Further, in the heavy object supporting device 1, the separation preventing structure 5 is configured to allow the mounting table 2 to be moved relative to the base 3 in the range in which the close contact state between the sealing member 4 and the mounting table 2 and between the sealing member 4 and the base 3 is maintained, that is, is configured to allow the mounting table 2 to be brought into contact with and separated from the base 3 (in the mutually facing direction), and to allow the mounting table 2 to be slid and rotated on the base 3.

Therefore, the heavy object supporting device 1 can prevent separation between the mounting table 2 and the base 3 in the non-supporting state and the supporting state, as a result of which leakage of the fluid F from the fluid-filled space S is securely prevented, and also, entry of air into the fluid-filled space S is prevented.

It should be noted that the heavy object supporting device 1 of the present invention is not limited to the above-described embodiment, and it is obvious that the heavy object supporting device 1 can be variously changed within the scope and spirit of the present invention.

In the above-described embodiment, the heavy object supporting device 1 includes one sealing member 4, but the present invention is not limited to this configuration. For example, the heavy object supporting device 1 may include a plurality of sealing members 4 arranged between the mounting table 2 and the base 3. In this case, each space, which is surrounded by each of the sealing members 4 between the mounting table 2 and the base 3, is configured as the fluid-filled space S formed by being sealed in the state filled with the fluid F. In this way, the heavy object supporting device 1 may be configured to include at least one sealing member 4.

Figure 9:
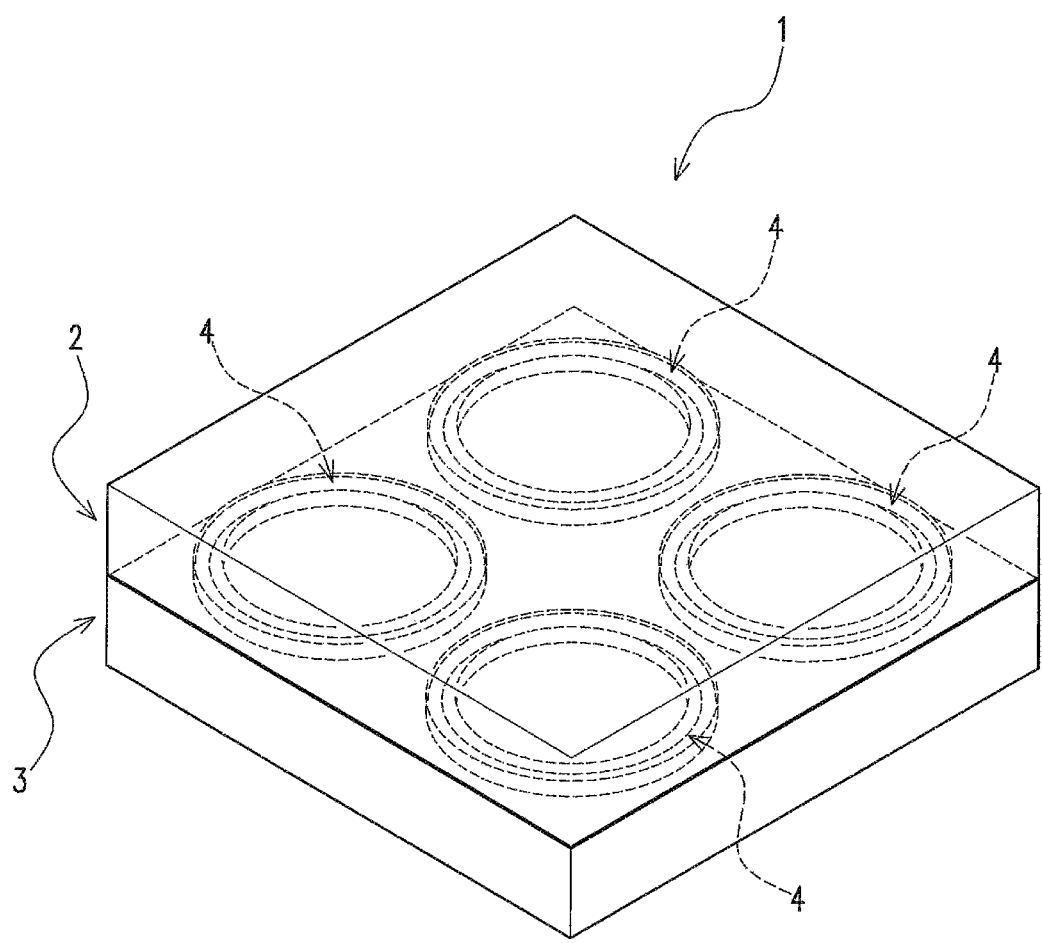
FIG. 9 is a perspective view of a heavy object supporting device according to another embodiment of the present invention.

In a heavy object supporting device 1 shown in FIG. 9, four sealing members 4 are arranged between a single mounting table 2 and a single base 3, and each of closed spaces, which is formed between the mounting table 2 and the base 3, and which is surrounded by each of the sealing members 4, is sealed in a state filled with the fluid F.

In the heavy object supporting device 1 configured in this way, even when the load of the heavy object O is concentrated at a position deviated from the center of the mounting table 2, the mounting table 2 can be prevented from being inclined with respect to the base 3. It should be noted that, when the heavy object supporting device 1 is configured to include a plurality of the sealing members 4, the distribution of the sealing members 4 (that is, the distribution of the fluid-filled spaces S) is preferably made uniform.

Although not particularly described in the above-described embodiment, the heavy object supporting device 1 may include a pressure control structure 6 which controls the pressure of the fluid F in the fluid-filled space S.

Figure 10:
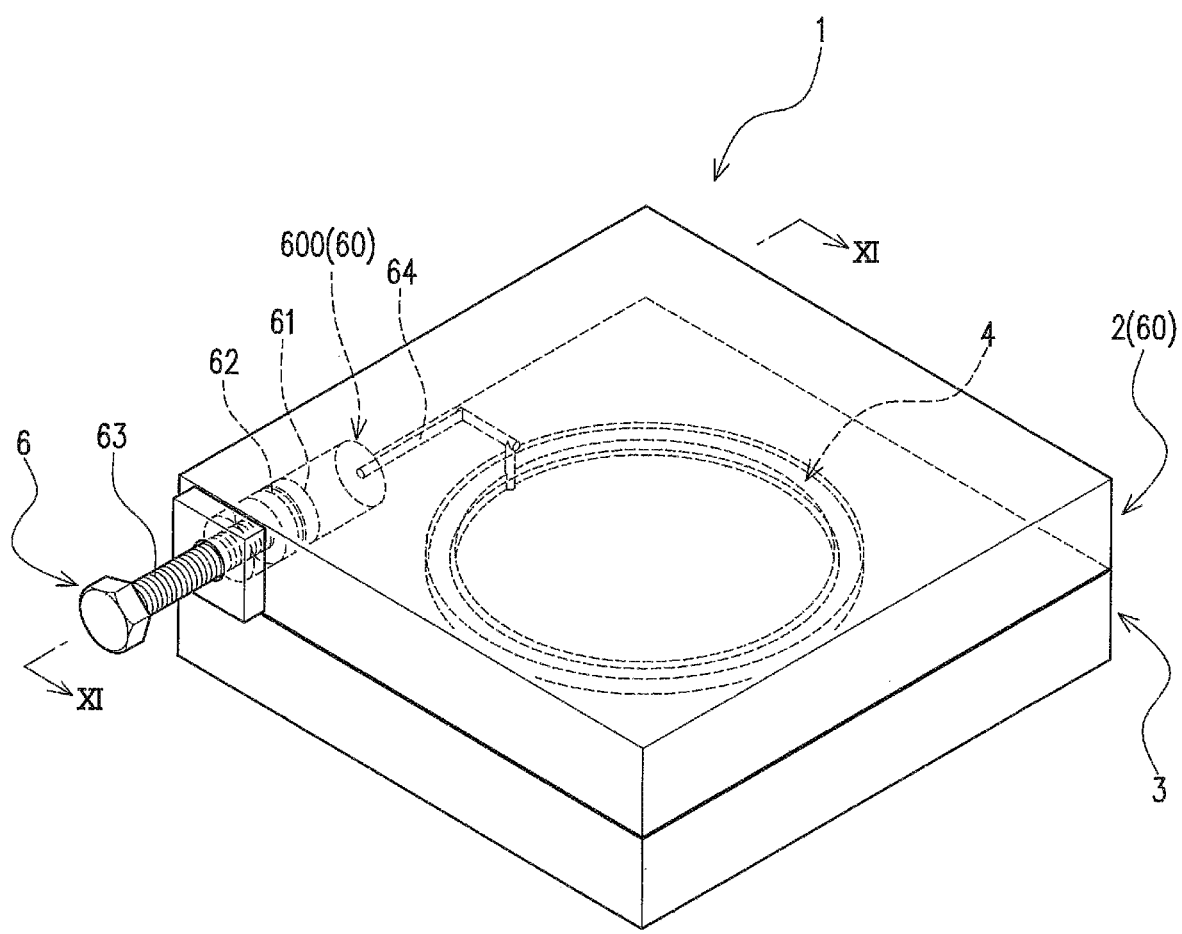
FIG. 10 is a perspective view of a heavy object supporting device according to still another embodiment of the present invention.

For example, as shown in FIG. 10 and FIG. 11, the pressure control structure 6 has an adjustment chamber 60 in which a storage space 600 is formed as a space communicating with the fluid-filled space S and sealed in a state filled with the fluid F. Further, the adjustment chamber 60 may be configured to be able to change the pressure in the storage space 600.

More specifically, the pressure control structure 6 may be configured to include: a movable wall section 61 arranged in the adjustment chamber 60; a sealing member 62 sealing between the entire outer circumference of the movable wall section 61 and the adjustment chamber 60; and an operation section 63 for moving the movable wall section 61 in the adjustment chamber 60.

In the heavy object supporting device 1 shown in FIG. 10 and FIG. 11, the storage space 600 is formed in such a manner that the inside of the adjustment chamber 60 is partitioned by the movable wall section 61 and the sealing member 62. Further, the storage space 600 communicates with the fluid-filled space S via a communication passage 64 provided in the mounting table 2 by drilling or the like.

For this reason, in the pressure control structure 6, it is possible that, when in the supporting state described above, the capacity of the storage space 600 is increased by moving the movable wall section 61 by the operation section 63, the pressure of the fluid F in the fluid-filled space S can be reduced, and that, when the capacity of the storage space 600 can be reduced, the pressure of the fluid F in the fluid-filled space S is increased. Therefore, in the pressure control structure 6, the fluid volume in the fluid-filled space S can be changed by changing the capacity of the storage space 600, and thereby, the pressure of the fluid F in the fluid-filled space S can be adjusted.

Further, the heavy object supporting device 1, shown in FIG. 10 and FIG. 11, is configured such that, in the supporting state, the mounting table 2 can be brought into contact with the base 3 by reducing the pressure of the fluid F in the fluid-filled space S. According to this configuration, by bringing the mounting table 2 into contact with the base 3, the motion of the mounting table 2 and the heavy object O on the base 3 can be stopped (that is, the position of the mounting table 2 and the heavy object O is fixable). From inspection of FIGS. 10 and 11, it is apparent that the device 1 includes an adjustment chamber 60 in which a storage space 600 and a passageway 64 in communication with the storage space 600 and the fluid-filled space 5 are formed in one of the mounting table 2 or the base 3. The storage space 600, together with the fluid-filled space 5 and the passageway 64, are configured to be filled with fluid F and sealed with a fixed amount of fluid F such that operation and adjustment of the device 1 occurs using only the fixed amount of fluid F in the spaces.

In the above-described embodiment, the sealing member 4 is arranged on the mounting table 2, but the present invention is not limited to this. For example, the sealing member 4 may also be arranged on the base 3. In this case, an arrangement groove open toward the side of the mounting table 2 may be formed in the base 3. In this way, the sealing member 4 may be arranged in one of the mounting table 2 and the base 3.

In the above-described embodiment, the sealing member 4 is configured such that the sealing ring 40 is separated from the protection ring 41, but the present invention is not limited to this. For example, the sealing ring 40 may be formed integrally with the protection ring 41.

REFERENCE SIGNS LIST

1: Heavy object supporting device
2: Mounting table
3: Base
4: Sealing member
5: Separation preventing structure
6: Pressure control structure
20: Mounting surface
21: Facing surface
30: Sealing surface
40: Sealing ring
41: Protection ring
50: Regulating section
60: Adjustment chamber
61: Movable wall section
62: Sealing member
63: Operation section
64: Communication passage
210: Arrangement groove
210a: Bottom surface
210b: Inner wall surface
210c: Outer wall surface
211: Pressure receiving surface
212: Slip surface
300: Seal region
301: Inner pressure-receiving region
302: Outer slide region
410: Regulating section
411: Peripheral wall section
412: Receiving concave section
500: Abutment stop section
501: Holding section
600: Storage space
D: Gap
F: Fluid
O: Heavy object
S: Fluid-filled space

The invention claimed is:

1. A heavy object supporting device comprising:
a mounting table on which a supported object is mounted;
a base which is arranged to face the mounting table to form a gap between the mounting table and the base;
at least one elastic annular sealing member having elasticity and an annular shape which is arranged between the mounting table and the base; and
a separation preventing structure which prevents separation between the mounting table and the base,
the base and the mounting table respectively having facing surfaces facing each other,
the mounting table having a separate annular arrangement groove for each of the at least one sealing member, wherein each groove is opened toward the base,
the facing surface of the base including a seal region configured to be in contact with the each of the at least one sealing member, an inner pressure-receiving region arranged inside the seal region, and an outer slide region arranged outside the seal region, and having the seal region, the inner pressure-receiving region, and the outer slide region formed to expand on the same plane,
the at least one sealing member being held in close contact with an inner surface of the arrangement groove and the facing surface of the base, with the at least one sealing member arranged in the arrangement groove,
a space, which is formed between the mounting table and the base and surrounded by the at least one sealing member, being formed as a fluid-filled space sealed off from an outside of the mounting table and the base in a state of being filled with fluid, the at least one sealing member being formed to support the mounting table against the base so as to form the gap, and being formed to be able to be compressed to reduce the gap, the mounting table having an outer peripheral edge entirely located outward of an outer peripheral edge of the base, the separation preventing structure being configured to permit relative movement between the base and the mounting table in a direction such that the mutually facing surfaces of the base and the mounting table come close to each other and away from each other, and relative sliding movement between the base and the mounting table in the direction orthogonal to the direction in which the mutually facing surfaces of the base and the mounting table come close to each other and away from each other, within a range to keep the close contact between the at least one sealing member and the mounting table, the separation preventing structure comprising a plurality of abutment stop sections extending downward from the outer peripheral edge of the mounting table and arranged to face a side of the base, and a plurality of holding sections each extending from each of the plurality of abutment stop sections and abutting the base from below, the fluid-filled space being configured to increase a pressure of the fluid with the supported object mounted on the mounting table, so that the mounting table is supported on the base in such a manner as to be slidable in the orthogonal direction with respect to the base by means of the pressure of the fluid, the heavy object supporting device further comprising a pressure control structure which controls the pressure of the fluid in the fluid-filled space, and the pressure control structure having: a storage space formed inside the mounting table, the storage space being filled with fluid and sealed with a fixed amount of fluid, a communication passage formed inside the mounting table and communicating the storage space with the fluid-filled space, the communication passage being filled with fluid and sealed with a fixed amount of fluid, a movable wall section arranged in the storage space, a sealing member located for sealing between an entire circumference of the movable wall section and an inner surface of the mounting table forming the storage space, and an operation section mounted on the mounting table and configured to move the movable wall section in the storage space.

2. The heavy object supporting device according to claim 1, wherein the at least one sealing member is configured by a plurality of the sealing members, each of the plurality of sealing members is arranged between the single mounting table and the single base, and the space surrounded by each of the plurality of sealing members is configured as the fluid-filled space.

* * * * *